Sept. 11, 1934.  H. M. GUINOT  1,973,529
METHOD OF RECTIFYING ALCOHOL
Filed June 27, 1932  2 Sheets-Sheet 1
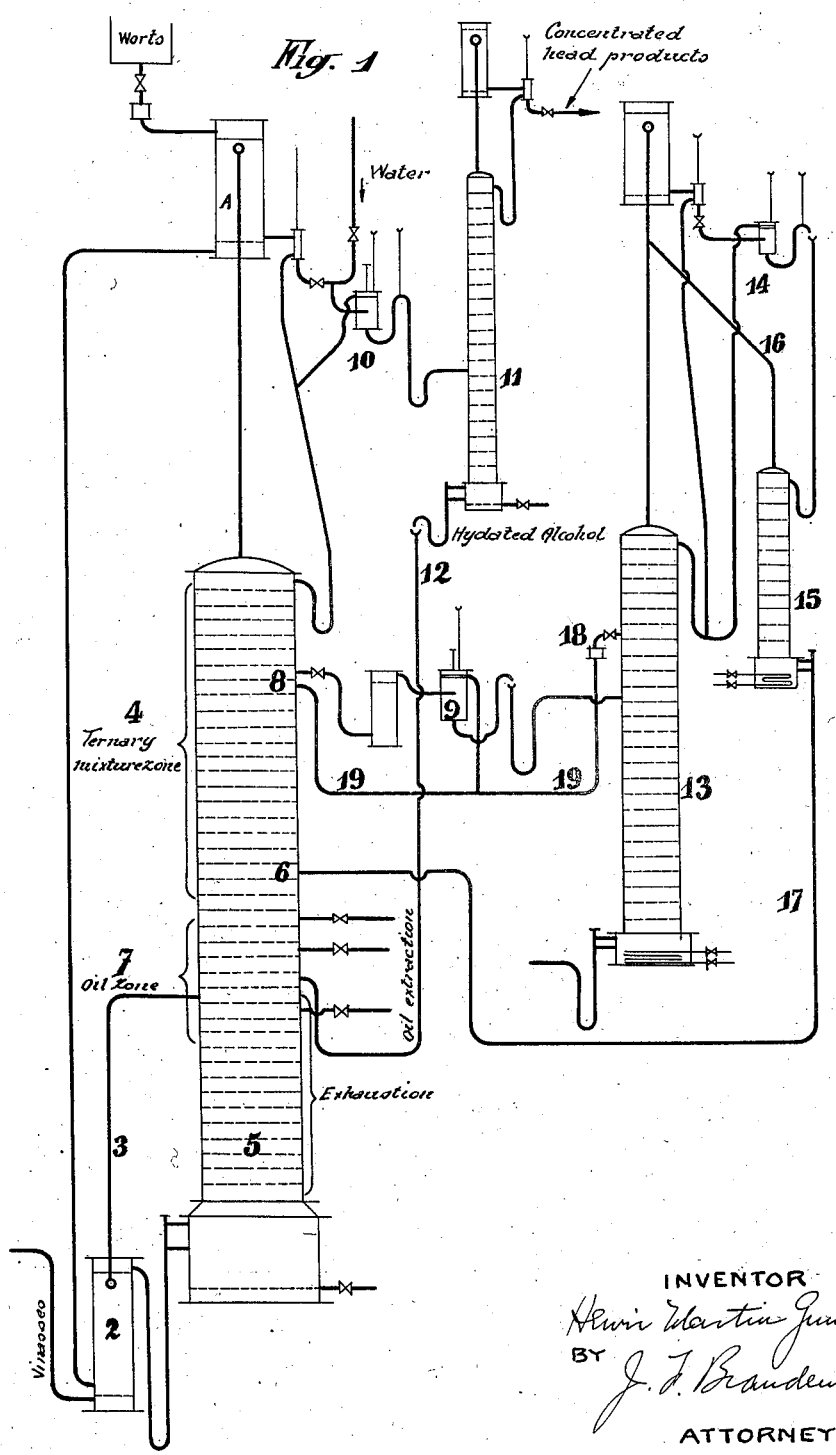

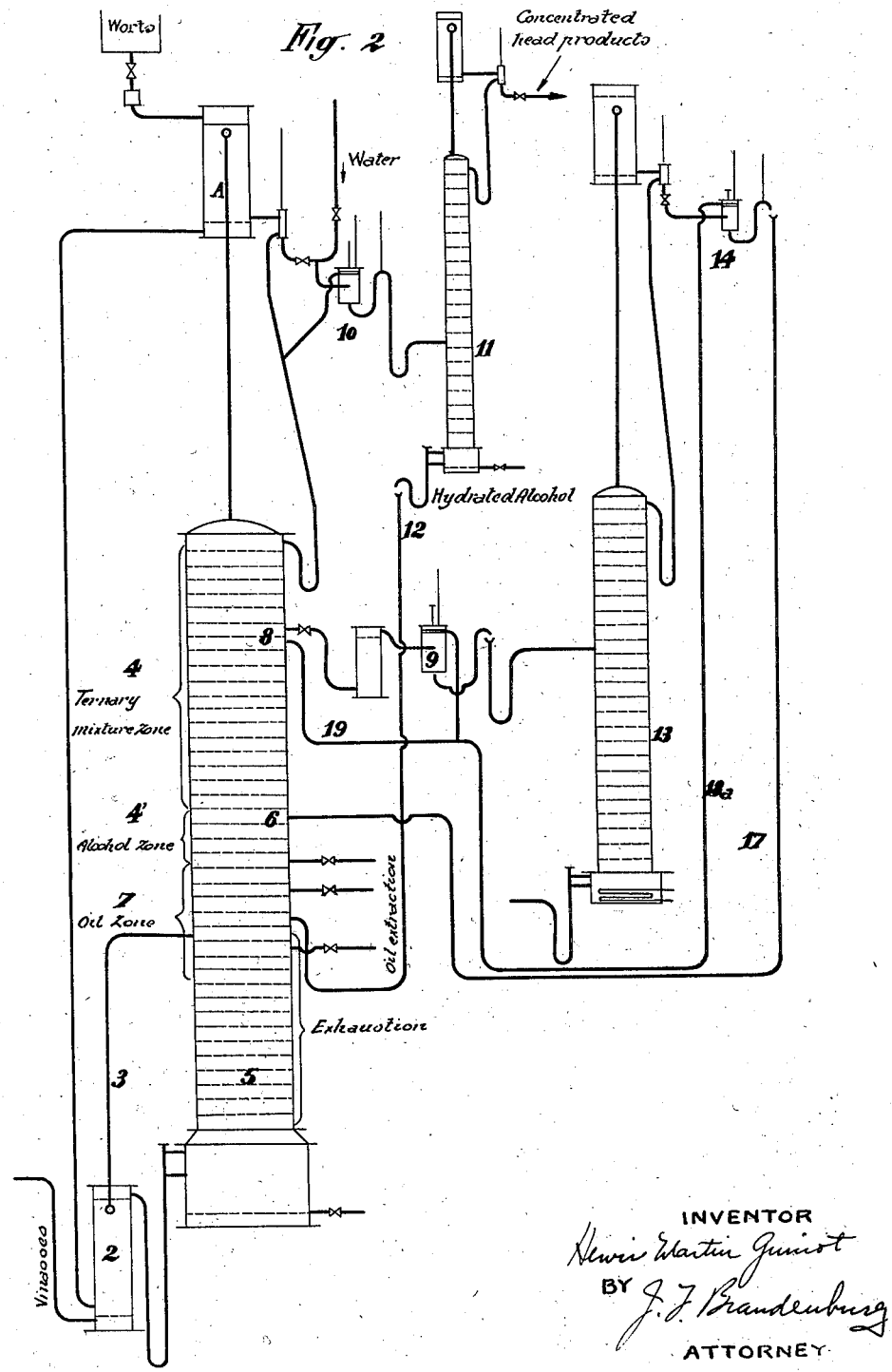

Patented Sept. 11, 1934

1,973,529

UNITED STATES PATENT OFFICE 1,973,529

METHOD OF RECTIFYING ALCOHOL

Henri Martin Guinot, Melle, France, assignor of one-half to Société Anonyme: Usines de Melle, Melle, France, a company of France Application June 27, 1932, Serial No. 619,419
In France July 6, 1931

10 Claims. (Cl. 202—41)

The removal of fusel oil in the rectification of alcohol has been obtained through several methods all of which have the disadvantage of being neither fully efficient nor economical, and which do not give a high output of good taste alcohol.

In the discontinuous apparatus of the Savalle type, or the continuous apparatus of the Barbet type, the fusel oils are prevented from rising with the rectified alcohol by providing a considerable reflux of high degree alcohol, which drives them back toward the bottom.

In the Guillaume rectifying apparatus, there is further made use of localized dilution, which method Eloi Ricard and myself have improved (Patent No, 1,929,901, dated October 10, 1933) by utilizing a hot water barrage, which facilitates the upward movement of the oils and stops alcohol.

It has been proposed by Mariller to subject the alcohol vapours to the systematic action of absorbing bodies which pass through the column and carry along the impurities to be extracted, by dissolving them.

The present invention has for its object a method of rectifying alcohol which is based on a new principle and makes it possible to obtain purer and more neutral alcohol with a lesser consumption of steam and a higher output of fine product.

My invention consists in concentrating the alcoholic vapours in the presence of a third body, which is placed once and for all in the column, and is analogous to the bodies utilized for eliminating water in the manufacture of absolute alcohol.

It has been found that these liquids have the surprising property of preventing entirely the fusel oils from ascending together with the alcoholic vapours. Said oils remain immediately below the zone in which is located the third body, whence it is easy to extract them in a much more concentrated state than it was possible with the former methods.

The alcohol is carried along by the entraining body with a certain amount of water and it is therefore wholly freed from oils after passing along a few plates of the column. The alcohol is then available in the heterogeneous liquid that covers the plates of the concentrating column. It therefore suffices to take off said mixture laterally a few plates below the top of the column. After decanting, either in the hot or in the cold state, the alcoholic layer is separated, which layer, when freed, through distillation, from the entraining liquid that it contains, yields a more or less aqueous but perfectly pure alcohol.

At the top of the concentrating column there are collected, besides the ternary azeotropic mixture, consisting of: the entraining liquid, water and alcohol and which forms the greatest part of the distillate, volatile impurities such as acetaldehyde, ammonia, fatty amines, acetone, esters, including ethyl acetate, dissolved gases, and so on. Said impurities can be removed by washing a portion of the distillate and subsequently distilling the aqueous layer, according to the method that is being utilized for azeotropic dehydrating and purifying.

At the bottom of the concentrating column, are collected the oils, which are localized in the zone comprised between the exhausting column on the one hand and the plates covered with the entraining liquid on the other hand, it is thus possible to maintain in that zone, without any inconvenience, a strong percentage of oils, which makes it much more easy to eliminate them.

However, the pure alcohol obtained according to the present invention generally contains too great a percentage of water to be sold directly in that state. In order to increase the concentration of the alcohol thus obtained, it is of course possible to have recourse to the ordinary distillation, but it is much too expensive, the consumption of steam for passing from 85 to 95° G. L. for instance, being but little smaller than that which is necessary for passing from 50 to 95° G. L. (see Savarit: Graphical Study of Distilling Columns for Binary and Ternary Mixtures, Chimie & Industrie, Liquid Fuels Congress, 1923).

Under these conditions, another characteristic of the present invention consists in raising the degree of the alcohol in a finishing column operated according to the azeotropic distillation practice by using as water entraining body the same liquid as has been used for entraining the alcohol in the main column. That method makes it possible to carry out in a single operation the concentration of the alcohol and the elimination of the entraining body.

The concentration of the alcohol can be pushed as far as it is desired and even as far as complete dehydration. During that concentration step, it will be necessary, in order to maintain in the two columns a constant amount of the entraining liquid, to remove continuously from the finishing column a quantity of the entraining liquid corresponding to that which is introduced together with the alcoholic mixture into said finishing column, and to continuously bring that quantity of the entraining liquid back into the main column.

As a rule, there may be utilized as entraining liquid any liquid, or mixture of liquids, that has already been proposed for the ordinary dehydration of alcohol, and more especially the bodies that make it possible to obtain a hydroalcoholic layer that is both abundant and of a high alcoholic content.

The method according to the present invention may be carried out either at atmospheric pressure or at another pressure, either with a view to recuperating heat, or with a view to obtaining more advantageous azeotropic mixtures.

Preferred embodiments of my invention will be hereinafter described with reference to the accompanying drawings, given merely by way of example and in which:

Fig. 1 is a diagrammatic view of a plant for carrying out the process according to my invention;

Fig. 2 is a diagrammatic view corresponding to a slightly different method.

The diluted alcohol to be treated, which is first heated at 1, and, if need be in vinasse exchanger 2, is fed, through pipe 3, into a high degree column 4 where it is deprived from alcohol in zone 5. The vapours that issue from said zone move upwardly in the concentrating column, which is supplied, once and for all, with a selected gasoline extracted from petroleum and boiling at about 100° C. That gasoline has the property of forming with water and alcohol a mixture having a minimum boiling point (68.3° C.) and the composition of which is as follows:

|  |  | Per cent |
|---|---|---|
| Upper layer 58.9% in weight | gasoline | 94.3 |
|  | alcohol | 5.4 |
|  | water | 0.3 |
| Lower layer 41% in weight | gasoline | 12.4 |
|  | alcohol | 71.5 |
|  | water | 16.1 |
| That is for the whole | petroleum gasoline | 60.6 |
|  | alcohol | 32.6 |
|  | water | 6.8 |

The petroleum gasoline has been supplied in such a manner as to maintain free a zone comprising only some plates at the lower part of the concentration column, which is easily controlled through the temperatures of the liquids boiling on the various plates. Said zone 7 is reserved for the fusel oils which are pushed back thereto by the barrage of petroleum gasoline. They are withdrawn and extracted in the ordinary manner.

Thus, nearly all the plates of the concentration column are covered with the heterogeneous ternary mixture: petroleum gasoline, alcohol, water. In the vicinity of the top of said column, the liquid is taken off laterally at 8. After cooling, it is caused to settle at 9. The upper layer, which contains a high percentage of petroleum gasoline, is returned into the main column through the pipe 19. The lower hydroalcoholic layer, which consists, in fact, of a mixture of an 81.7% alcohol (by weight) in which is dissolved 12.3% of petroleum gasoline, is removed at the suitable rate. It has been found that this alcohol does not contain any trace of fusel oil or of acid.

At the top of the main column 4 are accumulated the volatile impurities of the worts, such as carbon dioxide, ammonia, acetaldehyde, acetone, fatty amines, low-boiling esters, etc. . . They are of course very much diluted in the ternary mixture: petroleum gasoline-alcohol-water, which forms the greatest part of the distillate. In order to extract said impurities, a part of said distillate is removed, washed with water and sent into decanter 10. The upper layer, which contains a high percentage of gasoline, is sent back into the main column, and the aqueous layer charged with the volatile impurities is sent into column 11, at the top of which the head products are obtained in a concentrated state. The roughly purified hydroalcoholic liquid flowing to the bottom is sent back into the main column through pipe 12.

As for the purified alcohol coming from decanter 9, it is sent into finishing column 13 and it is concentrated to the desired degree by the usual azeotropic method, the petroleum gasoline being once more utilized, but now for entraining water. However, it should be noted that, through ordinary dehydration, there would be obtained at the top of said column 13 the ternary mixture: petroleum gasoline-alcohol-water, the lower layer of which has as a matter of fact, the same composition as the feed liquid. Therefore, if no special precautions were taken, said distillation in small column 13 would be absolutely without effect. Therefore, when it is desired to avoid the use of dehydrating salts, such as potassium carbonate, which are not easy to use, it is absolutely necessary to improve the conditions under which the decantation of the ternary mixture takes place. This is obtained by making use of a small quantity of an auxiliary entraining liquid capable of acting as a "uniting body", that is to say of causing a part of the alcohol present in the aqueous layer to pass into the upper layer of the ternary mixture, so that the percentage of water in the aqueous layer is thus increased. Said auxiliary entraining liquid, which serves only for the decantation, must be sufficiently volatile to remain on the upper plates of column 13. It must further be slightly soluble in water. Among bodies meeting these requirements I may cite, by way of example, methyl and ethyl acetates, benzene, isopropyl oxide, and so on. On the contrary, cyclohexane, which is extremely insoluble in water, could not be used. It will be found that by introducing a small quantity of these products the volume of the lower layer diminishes after condensation of the minimum boiling point ternary mixture, and that, on the contrary, the percentage of water in that layer increases in a substantial manner. Thus, by causing, through the addition of a small quantity of methyl acetate, the temperature at the top of small column 13 to go down from 68.3° C. to 65° C., the composition of the lower layer becomes the following:

|  | Per cent |
|---|---|
| Petroleum gasoline | 14 |
| Methyl acetate | 18 |
| Alcohol | 44 |
| Water | 24 | which corresponds to an alcohol of 65% by weight.

Owing to that fact, the concentration becomes easy. The lower layer, separated in decanter 14, which is itself fed with the distillate of small column 13, is sent into an auxiliary small column 15 in order to be freed from the petroleum gasoline and the methyl acetate that are dissolved therein. These two products are returned into the circuit through pipe 16, while the hydroalcoholic residue of that distillation is sent back into the main column 4 through pipe 17.

Finally, the alcohol fed to column 13 containing 12.3% of petroleum gasoline in solution, it is necessary to remove said gasoline in a continuous manner so as to maintain at a constant value the supply of entraining liquid in both columns 4 and 13. For this purpose, a suitable quantity of liquid is withdrawn at 18, some plates below the top of the column, at a point where the methyl acetate does not arrive. The petroleum gasoline thus separated is returned to main column 4 through pipe 19.

At the bottom of the finishing column, pure alcohol at the desired concentration is taken off.

When the worts are relatively dilute, small column 13, the temperature of the bottom of which is 78.5° C., can be heated without any expense by making use of a part of the calories of the vapours that move upwardly in the exhausting column or of the calories present in the vinasses.

Eloi Ricard and myself have already described in U. S. Patent No. 1,940,699, dated December 26, 1933, an analogous apparatus operating with entraining bodies of the same nature. But that patent concerned a process of manufacturing absolute alcohol, and not a process of purifying alcohol.

The analogy between the two processes is therefore only apparent. As a matter of fact the phenomena that take place in the two processes are entirely different.

In the above mentioned U. S. patent, the entraining body operates only at the upper part of the column. Everything takes place as if it were a case of an ordinary concentrating column the upper plates of which would be covered with an entraining body. There is obtained, through lateral withdrawal, a homogeneous liquid consisting of very much concentrated alcohol containing a small quantity of entraining body and, furthermore, a certain quantity of fusel oils, the barrage formed by the reflux of high degree alcohol being wholly unable to fully separate these products.

In the method according to the present invention, on the contrary, the entraining body works in the whole part of the column in which concentration takes place and fully prevents the fusel oils from moving upwardly together with the alcohol. By lateral withdrawal, I obtain the heterogeneous ternary mixture, entraining body-alcohol-water which, through decantation, yields an alcohol which is substantially less concentrated than in the preceding case, but is perfectly free from the impurities of the initial wort.

My invention further comprises a modification of the above described method which modification substantially simplifies the treatment of the aqueous layer in the decanter.

That modification, which will be described with reference to Fig. 2 of the accompanying drawings, consists in so adjusting the supply of entraining liquid into the main column as to slightly diminish that supply, so that some plates covered with alcohol are provided above the inlet of the worts, such, for instance as the plates designated by reference character 4' in Fig. 2, while maintaining, however, a great number of protecting plates covered with the entraining body, which are intended, as in the preceding case, to prevent the fusel oils from rising in the column. Under these conditions the removal of the water fed with the alcoholic vapours, being less rapid than in the preceding case, due to the fact that no entraining body is present on the first plates of the concentrating column, the mixture withdrawn laterally in the vicinity of the top of the column does not correspond any longer to the composition of the pure ternary mixture alcohol-water-entraining body. Said mixture contains a higher percentage of alcohol and a lesser percentage of water and its composition is therefore intermediate between that of the ternary mixture and that of the binary mixture alcohol-entraining body.

That mixture is generally a homogeneous body, even in the cold state, but owing to the high percentage of entraining body (from 70 to 75%) that is present therein, it is easy in any case to cause its decantation by means of a small addition of water, which is so measured as to obtain an aqueous layer in which the ratio $$\frac{alcohol}{water + alcohol}$$

corresponds to a high alcoholic content, from 90 to 95° G. L. for instance.

Said aqueous layer is then treated in the finishing small column 13 as it has been above explained with reference to Fig. 1. But, and here lies the advantage of the present modification, the pure ternary mixture water-alcohol-entraining body obtained at the top of said small column gives, through decantation at 14, a layer consisting of alcohol of concentration substantially lower than that of the liquid fed to the column (for instance 87° G. L. in the case of the selected petroleum gasoline). Under these conditions, the dehydration of the lower layer of decanter 9 may be readily carried out through azeotropic distillation in the finishing column, without necessitating in any way the use of the auxiliary entraining body which is absolutely necessary in the case of Fig. 1. Therefore, small column 15, which is intended for recuperating said second entraining body has no longer any use, and can be done away with. This corresponds to the arrangement shown in Fig. 2. It should be further noted that the finishing work of column 13 is considerably facilitated owing to the already very high degree of the alcohol fed thereinto.

The last described improvement therefore makes it possible to obtain, not only a considerable saving of steam in the finishing column, but also a saving in the apparatus and furthermore it has the advantage of permitting the use of a single entraining body in the whole of the apparatus.

As for the treatment of the layer of entraining body of decanter 9 and the withdrawal of the oils and impurities in the head products, they are performed exactly as in the case of Fig. 1.

In order to bring back the entraining body from decanter 14 into the main column, it is possible to connect directly said decanter to pipe 19 through pipe 18a.

What I claim is:

1. A method of preparing pure alcohol directly from worts, which comprises supplying the upper plates of a rectifying column with an auxiliary liquid which is capable of forming with alcohol and water a mixture of minimum boiling point and which in the presence of the vapours of the worts prevents the fusel oils from rising with the alcohol toward the top of the column, introducing worts into the column at a point lower than the lowermost plate supplied with said auxiliary liquid, thus reserving between said point and said lowermost plate a free zone for the collection of fusel oils, withdrawing fusel oils from said free zone, and removing the liquid which is purified alcoholic liquid laterally from the zone above said free zone.

2. A method according to claim 1, the worts being introduced into the column in vapour state.

3. A method of preparing pure alcohol directly from worts, which comprises supplying the upper plates of a rectifying column with an auxiliary liquid which is capable of forming with alcohol and water a mixture of minimum boiling point and which in the presence of the vapours of the worts prevents the fusel oils from rising with the alcohol toward the top of the column, introducing worts into the column at a point lower than the lowermost plate supplied with said auxiliary liquid, thus reserving between said point and said lowermost plate a free zone for the collection of fusel oils, withdrawing fusel oils from said zone, removing laterally the liquid which is purified alcoholic liquid from the zone above said free zone and separating the alcohol therefrom.

4. A method of preparing pure alcohol directly from worts, which comprises supplying the upper plates of a rectifying column with an auxiliary liquid which is capable of forming with alcohol and water a mixture of minimum boiling point and which in the presence of the vapours of the worts prevents the fusel oils from rising with the alcohol toward the top of the column, introducing worts into the column at a point lower than the lowermost plate supplied with said auxiliary liquid, thus reserving between said point and said lowermost plate a free zone for the collection of fusel oils, withdrawing fusel oils from said zone, removing laterally the liquid which is purified alcoholic liquid from the zone above said free zone, decanting said liquid so as to separate one layer containing a high percentage of the auxiliary liquid, and on the other hand a hydro-alcoholic layer, returning the first-mentioned layer into said rectifying column and treating the second-mentioned layer so as to remove therefrom the auxiliary liquid that it contains.

5. A method according to claim 4, which further comprises removing the impurities that accumulate at the top of said column together with said ternary azeotropic mixture through the methods used for dehydrating impure alcohol.

6. A method of directly preparing pure alcohol, according to claim 4, in which the treatment of the last mentioned layer comprises concentrating said layer, through azeotropic distillation in a finishing column, the entraining body for that treatment consisting of the first mentioned entraining body mixed with another entraining body, which must be more volatile and somewhat soluble in water, continuously removing from said finishing column an amount of the first mentioned entraining body equal to that which is dissolved in the liquid fed to that column, and continuously returning to the first mentioned column the entraining body thus extracted.

7. A method of directly preparing pure alcohol, which comprises, heating worts, causing the vapours therefrom to flow upwardly through a distilling column, feeding an entraining body adapted to be used for eliminating water in the azeotropic distillation of alcohol to the upper plates of the concentration zone of said column, whereby the alcohol mixed with said body is allowed to rise through said column past said zone, while the fusel oils present in the alcoholic vapours are stopped at the bottom of said zone, the rate of feeding said entraining body to said column being such that there are a few plates covered with alcohol without said entraining body immediately above the zone in which said fusel oils are stopped, removing laterally the liquid from the upper plates of said high degree column, which liquid consists of a mixture of alcohol, water and entraining body containing a lower percentage of water than the pure ternary azeotropic mixture, and separating the alcohol therefrom.

8. A method according to claim 7 in which the mixture removed laterally from the top of the distilling column is caused to decant, and the lower layer from that decantation step is dehydrated through azeotropic distillation in a finishing column with the same entraining body as that used in the first mentioned column.

9. A method of directly preparing pure alcohol according to claim 1 in which the liquid consists of petroleum gasoline.

10. A method of directly preparing pure alcohol according to claim 4 in which the entraining body consists of petroleum gasoline.

HENRI MARTIN GUINOT.